(12) United States Patent
Ye et al.

(10) Patent No.: US 8,929,860 B2
(45) Date of Patent: Jan. 6, 2015

(54) MOBILE COMMUNICATION TERMINAL AND INCOMING CALL MANAGEMENT METHOD

(75) Inventors: Dawei Ye, Huizhou (CN); Yu Zheng, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 22 days.

(21) Appl. No.: 13/978,876

(22) PCT Filed: Feb. 7, 2012

(86) PCT No.: PCT/CN2012/070936
§ 371 (c)(1),
(2), (4) Date: Jul. 9, 2013

(87) PCT Pub. No.: WO2012/159458
PCT Pub. Date: Nov. 29, 2012

(65) Prior Publication Data
US 2013/0281054 A1 Oct. 24, 2013

(30) Foreign Application Priority Data

May 24, 2011 (CN) .......................... 2011 1 0135659

(51) Int. Cl.
*H04W 12/12* (2009.01)
*H04W 8/18* (2009.01)
*H04W 4/16* (2009.01)
*H04W 4/00* (2009.01)

(52) U.S. Cl.
CPC ................ *H04W 8/183* (2013.01); *H04W 4/16* (2013.01); *H04W 4/003* (2013.01)
USPC ........... 455/410; 455/558; 455/420; 455/418; 455/422.1; 455/550.1

(58) Field of Classification Search
CPC ........ H04W 4/003; H04W 4/16; H04W 8/183
USPC ........... 455/458, 410–411, 414.1, 418–422.1, 455/435.2, 436, 456.1
See application file for complete search history.

(56) References Cited

U.S. PATENT DOCUMENTS

2012/0172011 A1* 7/2012 Gupta et al. ............... 455/414.1

FOREIGN PATENT DOCUMENTS

| CN | 1941997 A | 4/2007 |
| CN | 101072441 A | 11/2007 |

(Continued)

OTHER PUBLICATIONS

International Search Report issued by WIPO for PCT Application PCT/CN2012/070936, which is the PCT stage application of the current national stage U.S. Appl. No. 13/978,876.

*Primary Examiner* — Babar Sarwar
(74) *Attorney, Agent, or Firm* — Shimokaji & Associates P.C.

(57) ABSTRACT

The invention discloses a mobile communication terminal and an incoming call management method. The mobile communication terminal comprises a master SIM card and an auxiliary SIM card. The method comprises the following steps: when receiving an incoming call to the auxiliary SIM card, determining whether the auxiliary SIM card is locked; if the auxiliary SIM card is locked, stopping responding to the incoming call, and waiting for receiving from a user an instruction of whether to send a prompt message to inform a caller for the incoming call; and when receiving from the user an instruction of sending a prompt message to inform the caller for the incoming call, transmitting a prompt message that is automatically generated by the system or manually edited by the user to the caller with the master SIM card.

15 Claims, 5 Drawing Sheets

(56) References Cited

FOREIGN PATENT DOCUMENTS

| | | | |
|---|---|---|---|
| CN | 101287235 A | | 10/2008 |
| CN | 101437315 A | * | 5/2009 |
| CN | 101977263 A | | 2/2011 |
| CN | 102131184 A | | 7/2011 |
| CN | 102170623 A | | 8/2011 |
| CN | 102186159 A | | 9/2011 |

* cited by examiner

MOBILE COMMUNICATION TERMINAL AND INCOMING CALL MANAGEMENT METHOD

TECHNICAL FIELD OF THE INVENTION

The invention relates to the technical field of electronics, in particular to a mobile communication terminal and an incoming call management method.

BACKGROUND OF THE INVENTION

Current mobile communication devices, such as mobile phones, have already become an inseparable part in people's life and work. Mobile phones play a more and more important role in people's life and work, not only facilitating communications among people, but also integrating various functions for people to use.

Dual-card, dual-standby and multi-card, multi-standby technologies are new products generated according to the market requirements. How to reasonably and effectively manage Subscriber Identity Module cards (SIM cards) of mobile communication terminals is the biggest bottleneck for operators. In the prior art, a dual-card, dual-standby terminal and a method for realizing calling and registration is disclosed, comprising: the dual-card dual-standby terminal makes a call with a first User Identifier Module (UIM) card, and if the terminal initiates a registration of a second UIM card to the base station during the establishment of the call, the terminal proceeds with the establishment of the call after completing the registration. However, in the prior art, documents about how to restrict the use of SIM cards from other operators in a multi-SIM card mobile communication terminal purchased by the operator are not yet disclosed.

SUMMARY OF THE INVENTION

The technical problem mainly solved by the invention is to provide a mobile communication terminal and an incoming call management method, which prevents missing incoming calls when an auxiliary card is locked.

The following technical solution adopted by the invention to solve the above technical problem is to provide an incoming call management method of a mobile communication terminal, the mobile communication terminal comprising a master SIM card and an auxiliary SIM card, the method comprises the following steps of: upon receiving an incoming call to the auxiliary SIM card, determining whether the auxiliary SIM card is locked; if the auxiliary SIM card is locked, stopping a response to the incoming call to the auxiliary SIM card, and waiting for receipt from a user of an instruction of whether to send a prompt message to inform a caller for the incoming call; and in response to receiving from the user an instruction of sending a prompt message to inform the caller for the incoming call, transmitting to the caller a prompt message that is automatically generated by the mobile communication terminal or received from the user using the master SIM card.

Determining whether the auxiliary SIM card is locked comprises a step of determining whether the state of the mark bit of the auxiliary SIM card is in a locked state.

A state of the mark bit is determined by the following steps through the mobile communication terminal during the start-up procedure: reading information about national ID and network ID of the auxiliary SIM card; and comparing the read information about national ID and network ID of the auxiliary SIM card with information about national IDs and network IDs allowed to be used in the standard mobile communication terminal national ID and network ID information list; if information about national ID and network ID of the auxiliary SIM card is inconsistent with information about national IDs and network IDs allowed to be used in the standard mobile communication terminal national ID and network ID information list, then determining that the auxiliary SIM card is locked.

Stopping the response to the incoming call to the auxiliary SIM card when the auxiliary SIM card is locked further comprises a step of prompting the user that the auxiliary SIM card is locked.

Another technical solution adopted by the invention to solve the above technical problem includes providing an incoming call management method of a mobile communication terminal, the mobile communication terminal comprising a master SIM card and an auxiliary SIM card, the method comprises the following steps of: upon receiving an incoming call to the auxiliary SIM card, determining whether the auxiliary SIM card is locked; if the auxiliary SIM card is locked, stopping a response to the incoming call, and waiting for receipt from a user of an instruction of whether to send a prompt message to inform a caller for the incoming call; and upon receiving from the user an instruction of sending a prompt message to inform the caller for the incoming call, transmitting a prompt message to the caller with the master SIM card.

Determining whether the auxiliary SIM card is locked comprises a step of determining whether the state of a mark bit of the auxiliary SIM card is in a locked state.

The state of the mark bit is determined by the following steps through the mobile communication terminal during the start-up procedure: reading information about national ID and network ID of the auxiliary SIM card; and comparing the read information about national ID and network ID of the auxiliary SIM card with information about national IDs and network IDs allowed to be used in the standard mobile communication terminal national ID and network ID information list; if information about national ID and network ID of the auxiliary SIM card is inconsistent with information about national IDs and network IDs allowed to be used in the standard mobile communication terminal national ID and network ID information list, then determining that the auxiliary SIM card is locked.

Transmitting a prompt message to the caller with the master SIM card comprises a step of transmitting to the caller a prompt message that is automatically generated by the mobile communication terminal or received from the user using the master SIM card.

Stopping the response to the incoming call to the auxiliary SIM card when the auxiliary SIM card is locked further comprises a step of prompting the user that the auxiliary SIM card is locked.

Another technical solution adopted by the invention to solve the above technical problem is to provide a mobile communication terminal, comprising a master SIM card, an auxiliary SIM card, a communication management module, a prompt management module and an information transmission module; upon receiving an incoming call to the auxiliary SIM card, the communication management module determines whether the auxiliary SIM card is locked; when the auxiliary SIM card is locked, the prompt management module stops a response to the incoming call and waits for receipt from a user an instruction of whether to send a prompt message to inform a caller for the incoming call; and upon receiving from the user an instruction of sending a prompt message to inform the caller for the incoming call, the information transmission module transmits a prompt message to the caller with the master SIM card.

The communication management module comprises an information reading unit and an information comparison unit. The information reading unit is used for reading information about national ID and network ID of the auxiliary SIM card; and the information comparison unit is used for comparing the read information about national ID and network ID of the auxiliary SIM card with information about national Ds and network IDs allowed to be used in the standard mobile communication terminal national ID and network ID information list; if information about national ID and network ID of the auxiliary SIM card is inconsistent with information about national IDs and network IDs allowed to be used in the standard mobile communication terminal national ID and network ID information list, then determining that the auxiliary SIM card is locked.

Prompt messages sent by the information transmission module are automatically generated by the mobile communication terminal or received from the user.

The prompt messages comprise short message prompt messages, multimedia message prompt messages and/or mail prompt messages.

The communication terminal further comprises a user prompt module which is used for prompting a user that the auxiliary SIM card is locked, when the auxiliary SIM card is locked to stop responding to the incoming call to the auxiliary SIM card.

The invention has the following advantages: differing from the shortcomings of the mobile communication terminals and the incoming call management methods in the prior art that a user may miss an incoming call due to restriction of all functions of non-prefabricated SIM cards from other operators, the invention prompts the user whether to send a prompt message to inform the caller for the incoming call while stopping a response to the incoming call, upon receiving an incoming call to the auxiliary SIM card and when the auxiliary SIM card is locked; upon receiving from the user an instruction of sending a prompt message to inform the caller for the incoming call, the master SIM card transmits a prompt message to the caller; therefore, the user will not miss any incoming calls.

Further, by reading information about national ID and network ID of the auxiliary SIM card and comparing the read information about national ID and network ID of the auxiliary SIM card with information about national Ds and network Ds allowed to be used in the standard mobile communication terminal national ID and network ID information list, the invention determines the auxiliary SIM card to be a non-prefabricated card if the comparison result is inconsistent and then locks the auxiliary SIM card; in this way, the use of non-prefabricated cards from other operators can be effectively restricted without bringing any inconvenience to users through an objective use of the comparison.

Further, in the invention, a prompt message is obtained in two ways: one way is to receive the prompt message from the user, and the other way is to automatically generate the prompt message by the mobile communication terminal. After obtaining the prompt message, the master SIM card transmits the prompt message obtained by one of the above two ways to the caller, to prevent missing any incoming call and to provide a friendly indicator.

Further, the invention transmits the prompt message by means of short messages, multimedia messages or mails to a caller; and one or more ways can be selected to inform the caller, thus making the prompt more effective.

Further, by setting of a user prompt, when the auxiliary SIM card is locked and an incoming call is automatically rejected, the user is informed that the used auxiliary SIM card is a non-prefabricated SIM card and an incoming call is rejected.

DETAILED DESCRIPTION OF THE INVENTION

In the invention, a standard mobile communication terminal national ID and network ID information list is preset in a mobile communication terminal, such as a mobile phone. The information list is generally called a white list for an operator, namely, a Mobile Country Code (MCC) and Mobile Network Code (MNC) list, which is appointed, admitted and allowed to be used by the operator. MCC represents mobile country code, the resources of which are uniformly distributed and managed by the International Telecommunication Union (ITU), and MCC has a total of three numbers and is uniquely used for recognizing the affiliated country of a user; for example, MCC for China is 460. MNC represents a mobile network code, which has two total numbers and is used for recognizing the affiliated network of a mobile subscriber. MSISDN represents a Mobile Subscriber International ISDN/PSTN number, namely, a number needed to be dialled by a calling subscriber for calling a mobile subscriber, and the effect of MSISDN is the same as that of a Public Switched Telephone Network (PSTN) number which is a number capable of uniquely recognizing a mobile subscriber in the network number exchanging plan of a public telephone network.

When a user uses a SIM card which is not accepted and allowed to be used by the operator as a subscriber identifier card, the mobile communication terminal needs to evaluate the SIM card and restrict some related functions of the SIM card if it is not included in the white list, such as not allowing a call to be made, sending a message, surfing by GPRS and so on, or directly locking the mobile phone.

The invention will be further described in detail below by specific embodiments and with reference to drawings.

Figure 1:
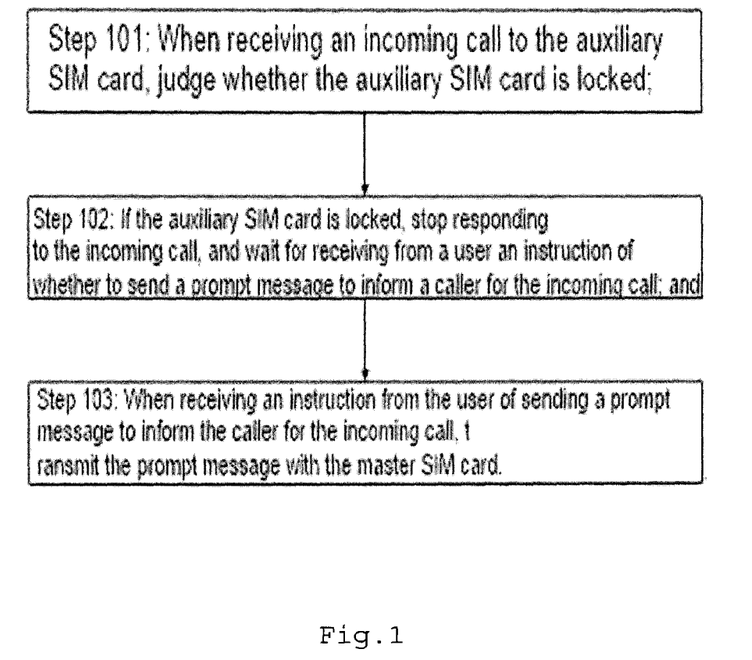
FIG. 1 is a step flowchart of an incoming call management method of a mobile communication terminal of the embodiments of the invention.

Referring to FIG. 1, an incoming call management method of the mobile communication terminal of embodiments of the invention, with the mobile communication terminal comprising a master SIM card and an auxiliary SIM card, comprises the following steps:

Step 101: upon receiving an incoming call to the auxiliary SIM card, determining whether the auxiliary SIM card is locked;

Step 102: if the auxiliary SIM card is locked, stopping the response to the incoming call, and waiting for receipt from a user an instruction of whether to send a prompt message to inform a caller for the incoming call; and Step 103: upon receiving an instruction from the user of sending a prompt message to inform the caller for the incoming call, transmitting a prompt message with the master SIM card.

As described above, upon receiving an incoming call to the auxiliary SIM card and the auxiliary SIM card is locked, the invention prompts the user whether to send a prompt message to inform the caller for the incoming call while stopping the response to the incoming call, and upon receiving from the user an instruction of sending a prompt message to inform the caller for the incoming call, transmits a prompt message to the caller with the master SIM card, to prevent the user from missing any incoming call.

In another embodiment of the invention, the step of determining whether the auxiliary SIM card is locked comprises a step of determining whether the state of a mark bit of the auxiliary SIM card is locked.

Figure 2:
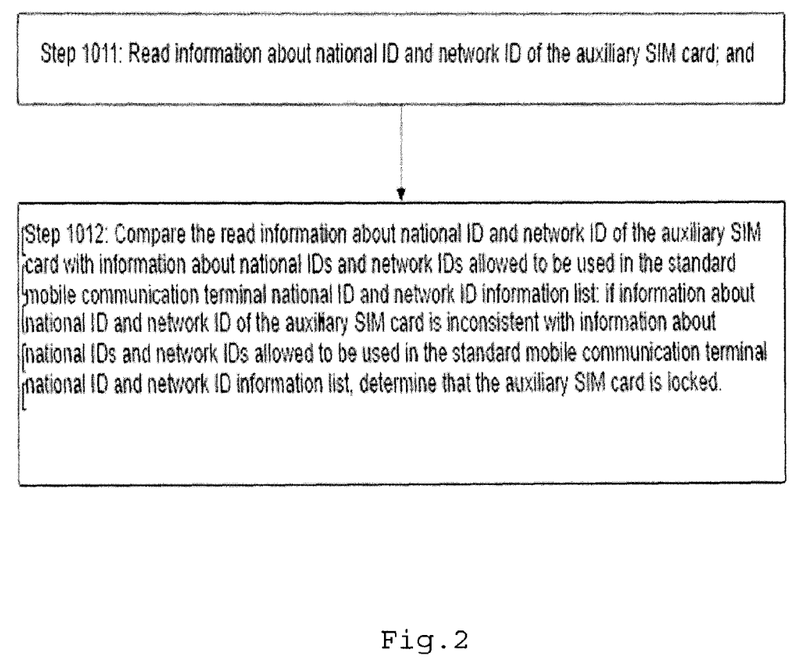
FIG. 2 is a step flowchart for determining the state of a mark bit of an auxiliary SIM card in the incoming call management method of the mobile communication terminal of the embodiments of the invention.

Referring to FIG. 2, in another embodiment of the invention, the state of the mark bit is determined by the following steps through the mobile communication terminal during the start-up procedure:

Step 1011: reading information about national ID and network ID of the auxiliary SIM card; and Step 1012: comparing the read information about national ID and network ID of the auxiliary SIM card with information about national Ds and network IDs allowed to be used in the standard mobile communication terminal national ID and network ID information list: if information about national ID and network ID of the auxiliary SIM card is inconsistent with information about national IDs and network IDs allowed to be used in the standard mobile communication terminal national ID and network ID information list, determining that the auxiliary SIM card is locked.

In this embodiment, by reading information about national ID and network ID of the auxiliary SIM card and comparing the read information about national ID and network ID of the auxiliary SIM card with information about national Ds and network Ds allowed to be used in the standard mobile communication terminal national ID and network ID information list, the invention determines the auxiliary SIM card to be a non-prefabricated card if the comparison result is inconsistent and then locks the auxiliary SIM card; in this way, the use of non-prefabricated cards from other operators can be effectively restricted without bringing any inconvenience to users through an objective use of the comparison.

In another embodiment of the invention, the step of transmitting a prompt message to the caller with the master SIM card comprises a step of transmitting to the caller a prompt message automatically generated by the mobile communication terminal or received from the user using the master SIM card. In the invention, the prompt message is obtained in two ways: one way is receive the prompt message from the user, and the other way is to automatically generate the prompt message by the mobile communication terminal. After obtaining the prompt message, the master SIM card transmits the prompt message obtained by one of the above two ways to the caller, to prevent missing any incoming call and to provide a friendly indication.

In another embodiment of the invention, the step of transmitting to the caller a prompt message automatically generated by the mobile communication terminal or received from the user using the master SIM card comprises a step of transmitting prompt messages to the caller by means of short messages, multimedia messages or mails which are automatically generated by the mobile communication terminal or received from the user using the master SIM card. The prompt messages are transmitted to the caller by means of short messages, multimedia messages or mails; and one or more ways can be selected to inform the caller, thus making the prompt more effective.

In another embodiment of the invention, the step of stopping the response to an incoming call to the auxiliary SIM card when the auxiliary SIM card is locked further comprises a step of prompting the user that the auxiliary SIM card is locked. By setting of a user prompt, when the auxiliary SIM card is locked and an incoming call is automatically rejected, the user is informed that the used auxiliary SIM card is a non-prefabricated SIM card and an incoming call is rejected.

Figure 3:
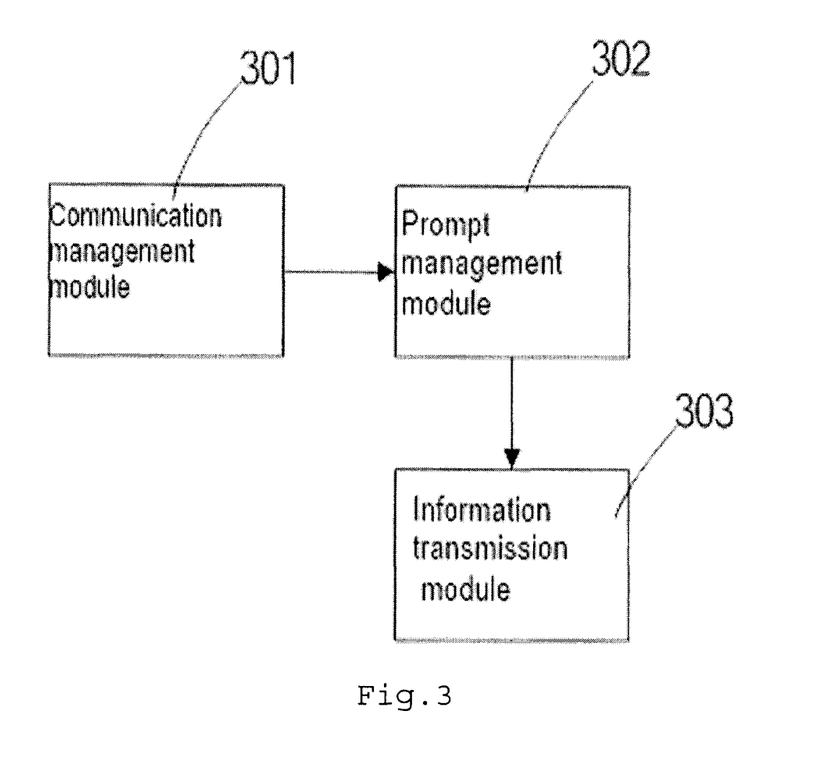
FIG. 3 is a structure diagram of a mobile communication terminal of the embodiments of the invention.

FIG. 3 shows a mobile communication terminal provided by the embodiments of the invention, comprising a master SIM card and an auxiliary SIM card, and further comprising:

a communication management module 301 for determining whether the auxiliary SIM card is locked, upon receiving an incoming call to the auxiliary SIM card;

a prompt management module 302 for stopping the response to the incoming call and waiting for receipt from a user an instruction of whether to send a prompt message to inform a caller for the incoming call, when the auxiliary SIM card is locked; and an information transmission module 303 for transmitting a prompt message to the caller with the master SIM card, upon receiving from the user an instruction of sending a prompt message to inform the caller for the incoming call.

As described above, the invention prompts the user whether to send a prompt message to inform the caller for the incoming call while stopping the response to the incoming call, upon receiving an incoming call to the auxiliary SIM card and when the auxiliary SIM card is locked; and upon receiving from the user an instruction of sending a prompt message to inform the caller for the incoming call, the master SIM card transmits a prompt message to the caller, therefore, the user will not miss any incoming call.

Figure 4:
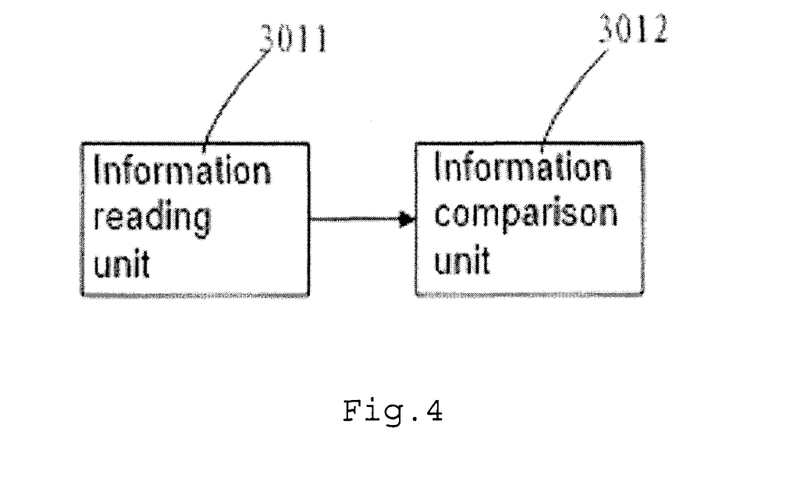
FIG. 4 is a structure diagram of a communication management module of the mobile communication terminal of the embodiments of the invention.

Referring to FIG. 4, in another embodiment of the invention, the communication management module comprises:

an information reading unit 3011 for reading information about national ID and network ID of the auxiliary SIM card, and an information comparison unit 3012 for comparing the read information about national ID and network ID of the auxiliary SIM card with information about national Ds and network Ds allowed to be used in the standard mobile communication terminal national ID and network ID information list: if information about national ID and network ID of the auxiliary SIM card is inconsistent with information about national Ds and network Ds allowed to be used in the standard mobile communication terminal national ID and network ID information list, determining that the auxiliary SIM card is locked.

In this embodiment, by reading information about national ID and network ID of the auxiliary SIM card and comparing the read information about national ID and network ID of the auxiliary SIM card with information about national Ds and network IDs allowed to be used in the standard mobile communication terminal national ID and network ID information list, the invention determines the auxiliary SIM card to be a non-prefabricated card if the comparison result is inconsistent and then locks the auxiliary SIM card; in this way, the use of non-prefabricated cards from other operators can be effectively restricted without bringing any inconvenience to users through an objective use of the comparison.

In another embodiment of the invention, the prompt message transmitted by the information transmission module is automatically generated by the mobile communication terminal or received from the user; and the prompt message is obtained in the above two ways: one way is to receive a prompt message from the user, and the other way is to automatically generate a prompt message by the mobile communication terminal. After obtaining the prompt message, the master SIM card transmits the prompt message obtained by one of the above two ways to the caller, to prevent missing any incoming call and to provide a friendly indicator.

In another embodiment of the invention, the prompt messages comprise short message prompt messages, multimedia message prompt messages and/or mail prompt messages. The prompt messages are transmitted to the caller by means of short messages, multimedia messages or mails; and one or more ways can be selected to inform the caller, thus making the prompt more effective.

In another embodiment of the invention, the mobile communication terminal further comprises a user prompt module, which is used for prompting a user that the auxiliary SIM card is locked, after the auxiliary SIM card is locked to stop responding to the incoming call to the auxiliary SIM card. By setting of a user prompt, when the auxiliary SIM card is locked and an incoming call is automatically rejected, the user is informed that the used auxiliary SIM card is a non-prefabricated SIM card and an incoming call is rejected.

Figure 5:
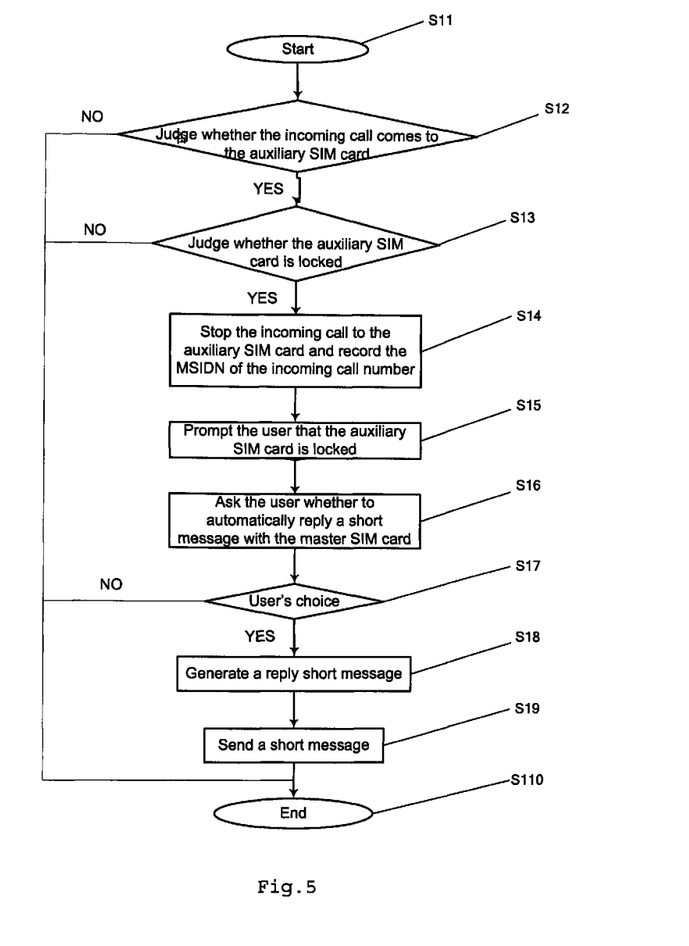
FIG. 5 is a flowchart of the incoming call management method of the mobile communication terminal of the embodiments of the invention.

FIG. 5 is a flowchart of the incoming call management method of the mobile communication terminal with multi-card multi-standby function provided by the embodiments of the invention. The method is suitable for mobile communication terminals with multi-card multi-standby function, such as a dual-card dual-standby mobile phone, which comprises a master SIM card (master card for short) and one or more than one auxiliary SIM card (auxiliary card for short), such that the master SIM card has communication fuctionality and is generally a SIM card customized by the operator. The functions of the auxiliary SIM card are subjected to certain restrictions, only having partial functions, such as receiving incoming calls, receiving short messages or surfing by GPRS.

Receiving an incoming call to a mobile phone of a user is regarded as the start step S11, to trigger the treatment for the incoming call.

A step S12 may include determining whether the incoming call is to the auxiliary SIM card.

In this step, the MSISDN information in the incoming call parameters is compared with the relative information about the telephone numbers of the master SIM card and the auxiliary SIM card. If the comparison result shows that the MSISDN information is consistent with information about the master SIM card, the receiver of the incoming call is the master SIM card, so the incoming call is not restricted. In this case, step S12 is directly skipped to step S110 to start the common answering procedure. If the comparison result shows that the MSISDN information is consistent with information about the auxiliary SIM card, it means that the incoming call may be restricted. In this case, step S13 is proceeded with.

A step S13 may include comparing information about a national ID and network ID of the auxiliary SIM card with information about national Ds and network IDs allowed to be used in the standard mobile communication terminal national ID and network ID information list for determining whether the auxiliary SIM card is locked.

In this step, the lock state of the auxiliary SIM card may be determined by reading the parameter of a certain mark bit of the auxiliary SIM card. If the function of receiving an incoming call to the auxiliary SIM card is not locked, then step S13 is directly skipped to step S110 to answer the incoming call; and if locked, step S14 is proceeded with.

A step S14 may include stopping the incoming call to the auxiliary SIM card and recording the MSIDN of the incoming call number.

In this step, the incoming call is automatically stopped or rejected as the function of receiving an incoming call to the auxiliary SIM card is locked to be unable to receive any incoming call. Meanwhile, the MSIDN information of the incoming call number needs to be recorded to process the incoming call with a corresponding prompt, and the information can be recorded in a register inside the mobile phone.

A step S15 may include prompting the user that the auxiliary SIM card is locked.

Because the incoming call number is automatically rejected by the mobile phone in step S14, in order to inform the user that there is a rejected incoming call to avoid the user missing any important call, it is needed to prompt the user. For example, the user can be prompted that an incoming call is missed due to locking of the auxiliary SIM card by means of providing prompt tones or displaying characters or icons on the display screen of the mobile phone, and different prompt information can be set according to different missing reasons; the prompt information may comprise calling time, calling number, calling name and rejecting reason, i.e., of the incoming call. Of course, other prompt ways and contents may be also adopted, which will not be listed here. As a result, although the auxiliary SIM card of the mobile phone rejects an incoming call, the user is prompted with the incoming call information, which is convenient for the user to get information about the incoming call and take corresponding measures according to the actual situation. For example, after knowing information about the rejected incoming call, the user may call the calling number with another mobile phone to avoid misunderstanding or missing any important incoming call.

A step S16 may include asking the user whether to automatically reply a short message with the master SIM card.

In this step, a dialog box may pop up to ask the user whether to reply the incoming call with a short message, and options "Yes" and "No" are provided for the user to choose conveniently (Step S17).

If the user chooses "No", the incoming call is not replied to with a short message using the master SIM card, then step S17 is skipped to step S110, and the treatment for the incoming call at this time ends, and if "Yes", then step S18 is proceeded with.

A step S18 may include generating a reply short message.

In this step, a reply short message is automatically generated, and preferably, the reply short message is sent to the rejected incoming call number from the master SIM card number, thereby making it convenient for the user to in time inform the caller the reason of rejecting the call. Specifically, the rejection information may be preset by the manufacturer or user, and the rejection content may comprise rejection reasons, such as the calling number is busy or the phone can not be connected due to poor signals and so on. The rejection content may also include other polite rejection reasons. The contents of the short messages are not restricted as long as they are capable of informing the caller that the call is rejected. Then step S19 is proceeded with and in this step, multimedia messages or mails, or one or more short messages, multimedia messages and mails may be generated to be transmitted at the same time, thus improving the reliability of the prompt message.

A step S19 may include sending a short message.

The short message is sent to the caller after being affirmed by the user; and in this step, the sent prompt message, such as the short message, multimedia message or mail, may be generated by the mobile communication terminal or received from the user.

A step S110 may end the process.

In this step, the realized functions for different skips have definite differences. If this step skips from S11 or S12, it is a step of making a call to the caller or answering the incoming call. If the step skips from S17, it is a step of stopping sending messages and standing by to wait for the next incoming call.

The incoming call management method of mobile phones of the invention is not only suitable for current common devices, such as 2G and 3G mobile phones, and is also suitable for other kinds of mobile communication devices.

For certain changed designs, step S15, step S16 and step S17 are selectable steps, which may be used or not used according to the actual requirements.

Figure 6:
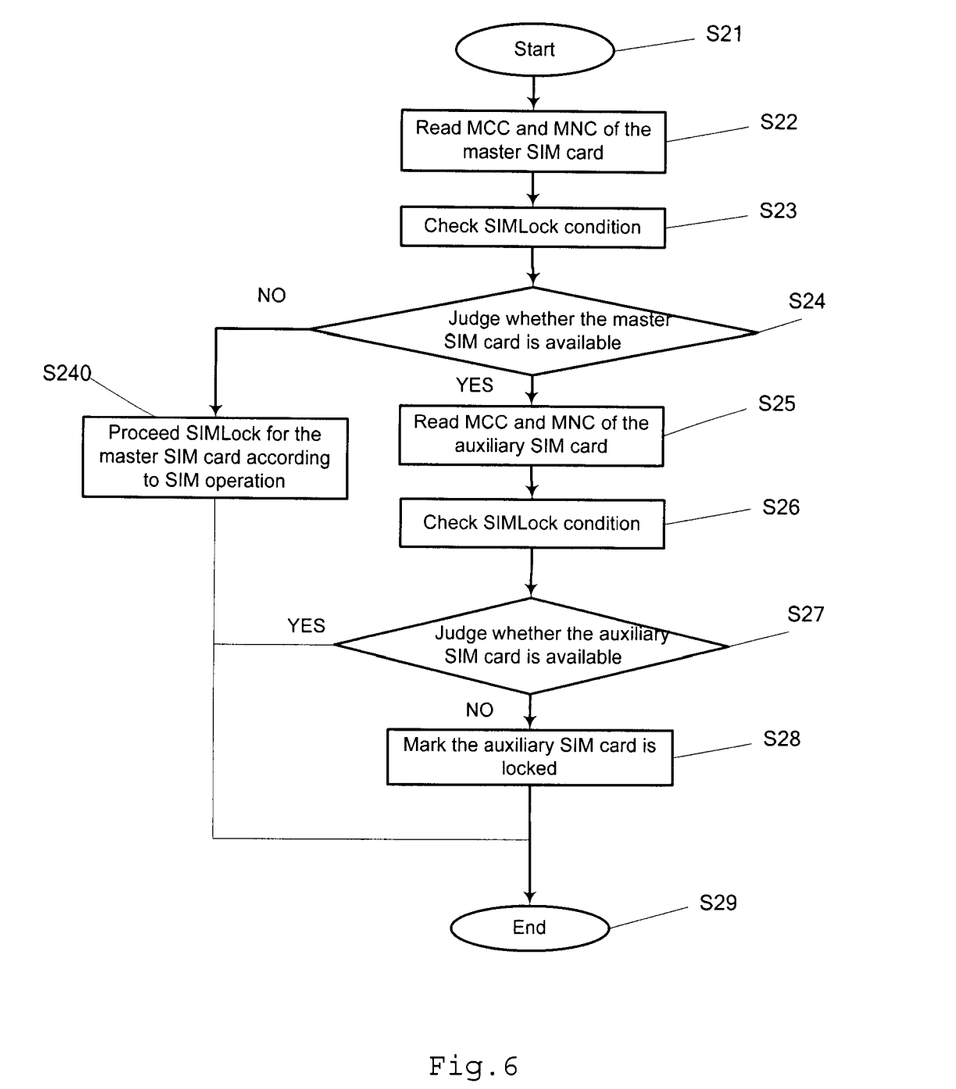
FIG. 6 is a flowchart for determining whether the auxiliary SIM card of the mobile communication terminal of the embodiments of the invention is locked.

Referring to FIG. 6, the method for determining whether the auxiliary SIM card is locked may be generally proceeded during the start-up of the mobile phone. The specific method comprises the following steps of:

A step S21 may be start-up of the mobile phone.

In this step, in addition to the start-up of the power of the mobile phone, the start-up of some essential software and hardware which ensures the normal operation of the mobile phone is finished. But the essential start-up conditions may be different according to the type of the mobile phones, which will not be specifically restricted in the invention.

A step S22 may include reading MCC and MNC of the master SIM card.

In this step, MCC and MNC of the master SIM card are read for recognizing the mobile national country code and the mobile network code of the master SIM card.

A step S23 may include checking a SIMLock condition.

In this step, the SIMLock condition of the mobile phone is read for determining whether the master SIM card of the mobile phone is a SIM card satisfying relevant requirements.

A step S24 may include determining whether the master SIM card is available.

In this step, it is necessary to check whether the read MCC and MNC of the master SIM card are in the standard mobile communication terminal national ID and network ID information list stored in the mobile phone, namely the white list.

If the result is "NOT", it means that the master SIM card is an SIM card not satisfying relevant requirements, and then step S24 is skipped to step S240 to proceed with SIMLock for the master SIM card according to the standard international SIM operation so as to lock the whole mobile phone and restrict all functions. Meanwhile, a user prompt message, containing prompt information by means of a short message, multimedia message or mail, is generated for informing the user that the master SIM card is locked, the functions thereof are all forbidden except the emergency call (SOS) function, and that the mobile phone can be used again by inputting the unlock information by the user. Then step S29 is proceeded with to lock the mobile phone and if "YES", the SIMLock condition is satisfied, the master SIM card can be used, and then step S25 is proceeded with.

A step S25 may include reading MCC and MNC of the auxiliary SIM card.

This step is similar to step S22, the only difference is that MCC and MNC of the auxiliary SIM card are read in this step.

A step S26 may include checking SIMLock condition.

This step is similar to step S23. The SIMLock condition of the mobile phone is read for deciding whether the auxiliary SIM card of the mobile phone is an SIM card satisfying relevant requirements.

A step S27 may include determining whether the auxiliary SIM card is unavailable.

In this step, it is needed to check whether the read MCC and MNC of the auxiliary SIM card are consistent with information about national Ds and network Ds in the standard mobile communication terminal national ID and network ID information list stored in the storage unit. That is, determine whether the auxiliary SIM card is available. If the auxiliary SIM card is unavailable, step S28 is proceeded with, the auxiliary SIM card is marked as locked, and SIMLock operation is proceeded with for the auxiliary SIM card, and the auxiliary SIM card is locked. The auxiliary SIM card may be locked by locking a mark. For example, a special mark bit in the memory of the mobile phone is used for marking, while the specific position of the memory is not restricted. Then step S29 is proceeded with and determination of this time ends.

If the mobile phone has multiple auxiliary SIM cards, steps S25-S28 may be repeated to complete SIMLock determination for all the auxiliary SIM cards.

Compared with the prior art, the incoming call management method of the mobile communication terminal with multi-card multi-standby function of the invention can recognize and determine incoming calls to the auxiliary SIM cards in multi-card multi-standby or dual-card dual-standby mobile phones. Incoming calls only to auxiliary SIM cards satisfying the preset rules can be answered, and the incoming calls to auxiliary SIM cards not satisfying the preset rules will be rejected automatically, realizing the matching of mobile phones with networks and operators, thus improving the competitiveness of network operators.

Meanwhile, the incoming call management method of the mobile communication terminal with multi-card multi-standby function of the invention is capable of transmitting polite rejection information to a caller after rejecting an incoming call to an unmatched auxiliary SIM card, thereby avoiding misunderstanding of the caller. Further, the method prompts the user with the rejection information of an incoming call, which is convenient for the user to take corresponding measures according to the actual situation, thereby avoiding missing any important incoming call and therefore being convenient for the user to use.

The above contents are just embodiments of the invention and are not provided to limit the patent scope of the invention. Any equivalent structures or equivalent flow transformations made by utilizing the contents of the specification and accompanying drawings of the invention, or any direct or indirect application thereof in other relevant technical fields, shall also fall within the protective scope of the invention.

The invention claimed is:

1. An incoming call management method of a mobile communication terminal, the mobile communication terminal comprising a master subscriber identity module (SIM) card and an auxiliary SIM card, wherein the method comprises the following steps of:
upon receiving an incoming call to the auxiliary SIM card, determining whether the auxiliary SIM card is locked by determining whether the state of a mark bit of the auxiliary SIM card is in a locked state, wherein the state of the mark bit is determined by the following steps through the mobile communication terminal during a start-up procedure:

reading information about a national ID and a network ID of the auxiliary SIM card;

comparing the read information about the national ID and the network ID of the auxiliary SIM card with information about national IDs and network IDs allowed to be used in a standard mobile communication terminal national ID and network ID information list; and if the read information about the national ID and the network ID of the auxiliary SIM card is inconsistent with the information about national IDs and network IDs allowed to be used in the standard mobile communication terminal national ID and network ID information list, determining that the auxiliary SIM card is locked;

if the auxiliary SIM card is locked, stopping a response to the incoming call, and waiting for an instruction as to whether to send a prompt message to inform a caller for the incoming call; and upon receiving an instruction of sending a prompt message to inform the caller for the incoming call, transmitting an automatically generated prompt message to the caller with the master SIM card.

2. The incoming call management method of a mobile communication terminal of claim 1, wherein the step of stopping a response to the incoming call when the auxiliary SIM card is locked further comprises a step of prompting a user that the auxiliary SIM card is locked.

3. The incoming call management method of a mobile communication terminal of claim 1, wherein if the information about the national ID and the network ID of the auxiliary SIM card is inconsistent with information about the national IDs and the network IDs allowed to be used in the standard mobile communication terminal national ID and network ID information list, the method includes determining that the auxiliary SIM card is a non-prefabricated card.

4. The incoming call management method of a mobile communication terminal of claim 1, including:

reading information about a national ID and a network ID of the master SIM card;

comparing the read information about the national ID and the network ID of the master SIM card with information about national IDs and network IDs allowed to be used in a standard mobile communication terminal national ID and network ID information list; and if the read information about the national ID and the network ID of the auxiliary SIM card is inconsistent with the information about national IDs and network IDs allowed to be used in the standard mobile communication terminal national ID and network ID information list, determining that the master SIM card is locked.

5. An incoming call management method of a mobile communication terminal, the mobile communication terminal comprising a master SIM card and an auxiliary SIM card, wherein the method comprises the following steps of:

in response to receiving an incoming call to the auxiliary SIM card, determining whether the auxiliary SIM card is locked by determining whether the state of a mark bit of the auxiliary SIM card is in a locked state, wherein the state of the mark bit is determined by the following steps through the mobile communication terminal during a start-up procedure:

reading information about a national ID and a network ID of the auxiliary SIM card; and comparing the read information about the national ID and the network ID of the auxiliary SIM card with information about national IDs and network IDs allowed to be used in a standard mobile communication terminal national ID and network ID information list;

if the read information about national ID and network ID of the auxiliary SIM card is inconsistent with the information about national IDs and network IDs allowed to be used in the standard mobile communication terminal national ID and network ID information list, determining that the auxiliary SIM card is locked;

if the auxiliary SIM card is locked, stopping a response to receiving the incoming call, and waiting for receipt of an instruction of whether to send a prompt message to inform a caller for the incoming call; and upon receiving an instruction of sending a prompt message to inform the caller for the incoming call, transmitting a prompt message to the caller with the master SIM card.

6. The incoming call management method of a mobile communication terminal of claim 5, wherein the step of transmitting a prompt message to the caller with the master SIM card comprises:

a step of transmitting a prompt message that is automatically generated to the caller with the master SIM card.

7. The incoming call management method of a mobile communication terminal of claim 5, wherein the step of stopping a response to receiving the incoming call of the auxiliary SIM card when the auxiliary SIM card is locked further comprises a step of prompting a user that the auxiliary SIM card is locked.

8. The incoming call management method of a mobile communication terminal of claim 5, wherein if the information about the national ID and the network ID of the auxiliary SIM card is inconsistent with the information about the national IDs and the network IDs allowed to be used in the standard mobile communication terminal national ID and network ID information list, the method includes determining that the auxiliary SIM card is a non-prefabricated card.

9. The incoming call management method of a mobile communication terminal of claim 5, including:

reading information about a national ID and a network ID of the master SIM card;

comparing the read information about the national ID and the network ID of the master SIM card with information about national IDs and network IDs allowed to be used in a standard mobile communication terminal national ID and network ID information list; and if the read information about the national ID and the network ID of the auxiliary SIM card is inconsistent with the information about national IDs and network IDs allowed to be used in the standard mobile communication terminal national ID and network ID information list, determining that the master SIM card is locked.

10. A mobile communication terminal comprising a master SIM card and an auxiliary SIM card, wherein the mobile communication terminal comprises:

a communication management module configured to, in response to receiving an incoming call to the auxiliary SIM card, determine whether the auxiliary SIM card is locked, wherein the communication management module comprises:

an information reading unit used for reading information about a national ID and a network ID of the auxiliary SIM card; and an information comparison unit used for comparing the read information about the national ID and the network ID of the auxiliary SIM card with information about national IDs and network IDs allowed to be used in a standard mobile communication terminal national ID and network ID information list: and if information about the national ID and the network ID of the auxiliary SIM card is inconsistent with information about national IDs and network IDs allowed to be used in the standard mobile communication terminal national ID and network ID information list, determining that the auxiliary SIM card is locked;

a prompt management module configured to, if the auxiliary SIM card is locked, stop responding to the incoming call and wait for an instruction as to whether to send a prompt message to inform a caller for the incoming call; and an information transmission module configured to, in response to receiving an instruction of sending a prompt message to inform the caller for the incoming call, transmit a prompt message to the caller with the master SIM card.

11. The mobile communication terminal of claim 10, wherein prompt messages sent by the information transmission module are automatically generated.

12. The mobile communication terminal of claim 11, wherein the prompt messages comprise short message prompt messages, multimedia message prompt messages and/or mail prompt messages.

13. The mobile communication terminal of claim 10, wherein the communication terminal further comprises a user prompt module which is configured to prompt a user that the auxiliary SIM card is locked, if the auxiliary SIM card is locked to stop responding to the incoming call to the auxiliary SIM card.

14. The mobile communication terminal of claim 10, wherein the information comparison unit is configured to determine that if the information about the national ID and the network ID of the auxiliary SIM card is inconsistent with information about the national IDs and the network IDs allowed to be used in the standard mobile communication terminal national ID and network ID information list, that the auxiliary SIM card is a non-prefabricated card.

15. The mobile communication terminal of claim 10, wherein the communication management module is configured to:

read information about a national ID and a network ID of the master SIM card;

compare the read information about the national ID and the network ID of the master SIM card with information about national IDs and network IDs allowed to be used in a standard mobile communication terminal national ID and network ID information list; and if the read information about the national ID and the network ID of the auxiliary SIM card is inconsistent with the information about national IDs and network IDs allowed to be used in the standard mobile communication terminal national ID and network ID information list, determine that the master SIM card is locked.

* * * * *